US012630676B2

(12) United States Patent
Cao

(10) Patent No.: US 12,630,676 B2
(45) Date of Patent: May 19, 2026

(54) SILYLATED SEALING COMPOSITION WITH IMPROVED ADHESION ON METALLIC SUBSTRATES

(71) Applicant: BOSTIK SA, Colombes (FR)

(72) Inventor: Yichen Cao, Shanghai (CN)

(73) Assignee: BOSTIK SA, Colombes (FR)

( * ) Notice: Subject to any disclaimer, the term of this patent is extended or adjusted under 35 U.S.C. 154(b) by 813 days.

(21) Appl. No.: 17/905,776

(22) PCT Filed: Mar. 1, 2021

(86) PCT No.: PCT/EP2021/054984
§ 371 (c)(1),
(2) Date: Sep. 7, 2022

(87) PCT Pub. No.: WO2021/180497
PCT Pub. Date: Sep. 16, 2021

(65) Prior Publication Data

US 2024/0191034 A1 Jun. 13, 2024

(30) Foreign Application Priority Data

Mar. 9, 2020 (EP) .................................... 20161825

(51) Int. Cl.
*C08G 77/02* (2006.01)
*C08L 83/02* (2006.01)

(52) U.S. Cl.
CPC .............. *C08G 77/02* (2013.01); *C08L 83/02* (2013.01); *C08G 2150/00* (2013.01); *C08G 2170/00* (2013.01)

(58) Field of Classification Search
CPC ................ C08G 77/02; C08G 2150/00; C08G 2170/00; C08G 77/18; C08G 65/336; C08L 83/02; C08L 75/08; C08L 83/04; C08L 71/02
See application file for complete search history.

(56) References Cited

U.S. PATENT DOCUMENTS

| | | | | |
|---|---|---|---|---|
| 2011/0151253 | A1 | 6/2011 | Laferte et al. | |
| 2019/0315917 | A1* | 10/2019 | Stanjek | C09J 171/02 |
| 2020/0095377 | A1 | 3/2020 | Sanz et al. | |
| 2020/0317853 | A1* | 10/2020 | Li | C09J 175/06 |

FOREIGN PATENT DOCUMENTS

| | | | |
|---|---|---|---|
| EP | 1657155 | A1 | 5/2006 |
| EP | 2336208 | A1 | 6/2011 |

(Continued)

OTHER PUBLICATIONS

ISA/EP; International Search Report and Written Opinion for International Patent Application No. PCT/EP2021/054984 dated May 17, 2021, 10 pages.

*Primary Examiner* — Randy P Gulakowski
*Assistant Examiner* — Holley Grace Hester
(74) *Attorney, Agent, or Firm* — Rimon P.C.; Allyn B. Elliott

(57) ABSTRACT

A moisture curable silylated composition comprising:

a polymer (A) comprising at least 2 alkoxysilyl terminal groups of formula (I):

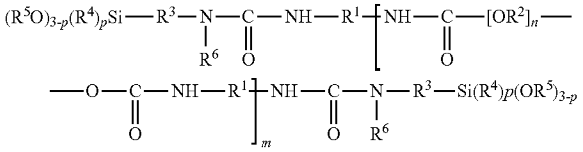

wherein $R^1$ represents a hydrocarbon-based divalent radical comprising from 5 to 15 carbon atoms; $R^2$ represents a $C_2$-$C_4$ alkylene; $R^3$ represents a $C_1$-$C_6$ alkylene; $R^4$ and $R^5$ each represent a $C_1$-$C_4$ alkyl; $R^6$ represents H or a radical comprising 1 to 6 carbon atoms; n is an (Continued)

integer such that Mw of the block of formula —$[OR^2]_n$— is 300 to 40000 g/mole; m is an integer different from 0 such that the Mw of the polymer (A) is between 500 to 50000 g/mole, and p is an integer equal to 0, 1 or 2;

a polymer (B) comprising at least 2 alkoxysilyl terminal groups of formula (II):

$$(R^5O)_{3-p}(R^4)_pSi-CH_2-NH-\underset{\underset{O}{\|}}{C}-[OR^2]_n-O-\underset{\underset{O}{\|}}{C}-NH-CH_2-Si(R^4)_p(OR^5)_{3-p}$$

wherein $R^2$, $R^4$, $R^5$, n and p are such as defined for formula (I); and an alkoxy modified silsesquioxane (C).

8 Claims, 1 Drawing Sheet

(56) References Cited

FOREIGN PATENT DOCUMENTS

| | | | | |
|---|---|---|---|---|
| FR | 3066765 | A1 | 11/2018 | |
| WO | 2008107331 | A1 | 9/2008 | |
| WO | 2013136108 | A1 | 9/2013 | |
| WO | 2014031568 | A1 | 2/2014 | |
| WO | 2016174009 | A1 | 11/2016 | |
| WO | WO-2019126246 | A1 * | 6/2019 | ............. C08G 18/12 |

* cited by examiner

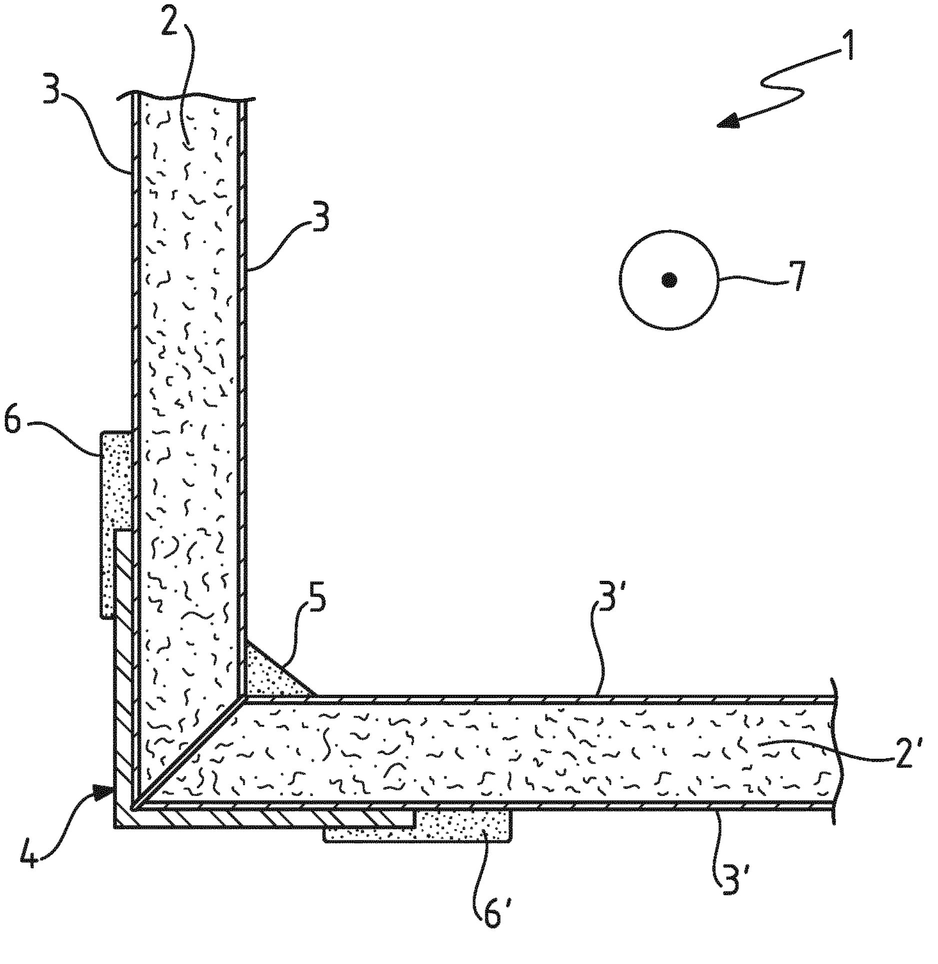
1
2
3
3
7
6
5
3′
2′
4
3′
6′

SILYLATED SEALING COMPOSITION WITH IMPROVED ADHESION ON METALLIC SUBSTRATES

CROSS-REFERENCE TO RELATED APPLICATIONS:

This application is a U.S. National Stage application of International Patent Application No. PCT/EP2021/054984, filed on Mar. 1, 2021, which claims the benefit of European Patent Application No. 20161825.3, filed on Mar. 9, 2020.

TECHNICAL FIELD

The present invention relates to a moisture curable silylated composition, and to its use as an adhesive, sealant and/or coating material, preferably to its use for assembling metallic substrates and/or filling gaps between them.

STATE OF THE ART

Sealing (or sealant or caulk) compositions are widely used in the construction field. They are implemented to assemble substrates, for example made of concrete, via expansion joints. In such a use, they make it possible, by virtue of their mechanical and in particular elastic properties, to obtain a joint, which is stable to the dimensional variations brought about by changes in temperature. Sealant compositions may also be used for the adhesive bonding of floor coverings, in particular of wooden floors.

Generally packaged, for the purpose of manual use, in cartridges provided with a nozzle at one end, sealant compositions are applied after having placed said cartridge in a gun. The handling by the operator of the gun trigger actuates a piston, which extrudes the sealant, through the nozzle, on one of the substrates to be assembled and/or introduces it into the gap between the two substrates to be joined.

Sealant compositions comprise a moisture-crosslinkable prepolymer, the chemical structure of which has, generally terminal, isocyanate or alkoxysilyl reactive groups.

After the extrusion of the sealant on a substrate for making an assembly and/or into the gap between the two substrates to be filled in, these reactive groups undergo a crosslinking or curing reaction with the water which comes from the air moisture or from the substrate moisture. This reaction results in the creation of a solid three-dimensional polymeric network including siloxane bonds, which forms an adhesive joint between the 2 substrates.

Within the industrial field, such as the transport industry, silylated sealing compositions are known.

As an example, EP 1657155 describes a process for caulking a ship deck by means of a moisture curable sealing composition, which comprises one or more silyl-modified polyacrylates.

In the process described by this European patent, wood planks are, in a first step, bonded on the ship subdeck. There remains between adjacent planks an empty interspace or gap (also called a seam), which follows the perimeter of the planks. Said process thus comprises, in a second step, sealing (or jointing or caulking) the bonded wood planks by filling the seams around them by the application of the sealing (or sealant) composition. The curing of said composition results in the formation of a joint which prevents undesirable products like dust, dirt, moisture, chemicals or sea water from penetrating into the seam and from being in contact with the subdeck. Possible damage or corrosion of the subdeck is thus prevented.

However, there are many applications in the industry at large, and in the transport industry in particular, in which it is desirable to obtain an adhesive joint between 2 substrates other than concrete or wood, when one is looking for assembling them and/or sealing the gap (or seam) between them by means of a sealant composition.

In particular, there is a need to obtain an adhesive joint between 2 metallic substrates. The formation of such an adhesive joint may be desired for procuring to the joint such advantageous properties as air and/or water tightness.

As an example, one may cite the assembly of the vent pipes, which are implemented for the air transfer and exchange from the air conditioner systems developed for high-speed trains. Such vent pipes have a rectangular cross-section and extend throughout the train. They are assembled by screwing laminated insulating panels on metallic rigid frames, made for instance of aluminium. These insulating panels generally consist of a polyurethane foam board about 10 mm thick, which is coated on both sides by a metallic foil, for instance by an aluminium foil, of about 0.5 mm thickness.

In such an assembly, seams are formed at the interfaces between the metallic surface of the insulating panels and the metallic rigid frames on which they are screwed. Other seams are formed along the internal edges resulting from the intersection at a right angle of the 4-metallic foils which coat the 4 insulating panels that are arranged on the four sides of the vent pipes rectangular cross-section.

It is therefore required that such seams be sealed by an adhesive joint, in order to prevent a leakage of the strong air stream which flows inside the vent pipes and to guarantee that said vent pipes which extend throughout the train length are perfectly airtight (or airproof). This requirement is all the more important because of the high speed of the train (about 300 km/hour) due to be equipped with the vent pipes included in the air conditioner system. As cold and/or warm air streams flow across the vent pipes, if the joint adhesion were to fail, then there might be adverse problems, such as a very loud wind noise, like whistling, during the running of the train.

For such a seal to be effective in terms of airtightness, a high level of adhesion of the sealing joint to the metallic substrates is therefore paramount.

Further, as a high-speed train is able to circulate during one day across huge distances and different climates, it is likely to encounter various air temperature and humidity conditions. There is thus the risk that water could condense, inside the vent pipes, on the metallic foil surface of the insulating panels, and be in contact with the seal.

There is therefore also the need that the high level of adhesion of the sealing joint to the metal substrate be maintained, even after extended contact with water.

One aim of the present invention is thus to propose a new moisture curable silylated composition that presents, after curing, a high level of adhesion on metallic substrates, in particular on aluminium.

Another aim of the present invention is to propose a new silylated moisture curable composition that presents, after curing, a high level of adhesion on metallic substrates, in particular on aluminium, which is maintained after extended contact with water.

Another aim of the present invention is to propose a new silylated moisture curable composition with appropriate viscosity and curing time suitable for use as a sealant.

Another aim of the present invention is to propose a new silylated moisture curable composition, which is likely to be used for assembling metallic substrates and/or filling gaps between them, in particular with respect to aluminium substrates.

It has been found that the above aims can be totally or partly achieved by means of the moisture curable composition according to the invention, which is described hereinafter.

DETAILED DESCRIPTION OF THE INVENTION

The present invention relates to a moisture curable silylated composition characterized in that it comprises, on the basis of the total weight of said composition:

from 35 to 65% by weight of a polymer (A) comprising at least 2 alkoxysilyl terminal groups of formula (I):

(I)

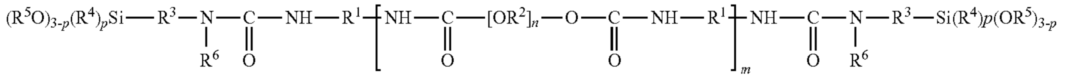

wherein $R^1$ represents a hydrocarbon-based divalent radical comprising from 5 to 15 carbon atoms which may be aromatic or aliphatic, linear, branched or cyclic, $R^2$ represents a linear or branched alkylene divalent radical comprising from 2 to 4 carbon atoms, $R^3$ represents a linear or branched alkylene divalent radical comprising from 1 to 6 carbon atoms, $R^4$ and $R^5$, which are identical or different, each represent a linear or branched alkyl radical having 1 to 4 carbon atoms, with the possibility, when there are several $R^4$ (or $R^5$) radicals, that these are identical or different, $R^6$ represents a hydrogen atom or a radical comprising 1 to 6 carbon atoms which may be aromatic or aliphatic, linear, branched or cyclic, or a radical selected among the radicals:

of formula (Ia):

(Ia)

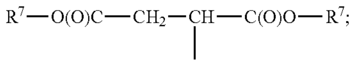

of formula (Ib):

(Ib)

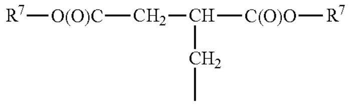

or of formula (Ic):

(Ic)

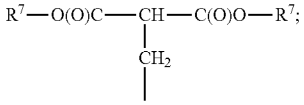

wherein $R^7$ is linear or branched alkyl radical comprising from 1 to 6 carbon atoms;

n is an integer such that the average molecular weight of the polyether block of formula $[OR^2]_n$ is between 300 g/mole and 40000 g/mole, m is an integer different from 0 such that the average molecular weight of the polymer (A) is between 500 g/mole and 50000 g/mole, and p is an integer equal to 0, 1 or 2;

from 2.5 to 12% by weight of a polymer (B) comprising at least 2 alkoxysilyl terminal groups of formula (II):

(II)

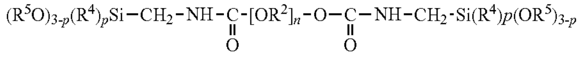

wherein $R^2$, $R^4$, $R^5$, n and p are such as defined for formula (I); and from 7.5 to 28% by weight of an alkoxy modified silsesquioxane (C).

It has been found that the moisture curable composition such as previously defined unexpectedly results, after curing with moisture, to a cured composition which advantageously possesses a high level of adhesion to metallic substrates, and in particular to aluminium substrates.

Such a high level of adhesion can be experimentally infered from the failure mode of tensile trials carried out on a 2-layer system consisting of a layer of said cured composition coated on an aluminium substrate. Indeed, in the field of adhesives and sealants, several types of failure in tensile trials may be distinguished:

adhesive failure, which occurs at the sealant/substrate interface, cohesive failure, that occurs within the actual layer of the sealant, each of the substrates bearing a fraction of the sealant;

substrate failure (also called substrate break), which is independent from the adhesive.

There are also many intermediate situations, which are assessed by the percentage of the relevant substrate surface.

Now, it has been found that the adhesive joint consisting of the cured composition coated on aluminium shows, quite advantageously, a cohesive-type failure or substrate failure in tensile trials.

The moisture curable composition according to the invention is thus in particular well suited to a use aiming at assembling metallic substrates and/or filling gaps between them.

In particular, it is well suited to a use for assembling vent pipes, which are due to be included in the air conditioner systems developed for high-speed trains.

FIG. 1 represents an enlarged cross-section view of a part of such a vent pipe (1) which presents a rectangular cross-section.

Polyurethane foam boards (2) and (2') coated on their both sides by aluminium foils (3) and (3') are used.

Each end of said polyurethane foam boards (2) and (2') are cut according to a 45° slope, in order to match each other and form a right angle, after being fixed on an aluminium frame (4) by screws (not shown on the figure).

Such an assembly results in the formation of seams at the interface inside the vent pipe between aluminium foils (3) and (3') and also at the interface outside the vent pipe between aluminium frame (4) from the one hand and aluminium foils (3) and (3') from the other hand.

Such seams are sealed/filled in by the introduction of the moisture curable composition according to the invention, followed by its moisture curing, resulting into bead (5) and strips (6), (6') which prevent leakage of the strong air stream which flows inside the vent pipe, in a direction (7) perpendicular to the plane of the figure.

Furthermore, it has been found that the curing time of the moisture curable composition according to the invention, as assessed by the skinning time test, is comprised between 15 and 45 minutes and its viscosity is comprised, as measured by Rheometer between 20 and 50 Pa·s. These properties make the composition well suited to being applied as a sealant, in particular by means of cartridges provided with a nozzle at one end.

Polymer (A) Comprising at Least 2 Alkoxysilyl Terminal Groups of Formula (I):

The moisture curable composition according to the invention comprises from 35 to 65% by weight of polymer (A).

According to a preferred variant, polymer (A) is such that:

$R^1$ is chosen from one of the following divalent radicals, the formulae of which below show the 2 free valences:

a) the divalent radical derived from isophorone diisocyanate (LPDI):

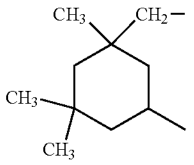

b) the divalent radical derived from methylenebis(cyclohexyl isocyanate) (HMDI):

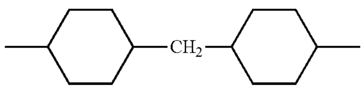

c) the divalent radical derived from tolylene diisocyanate (TDI):

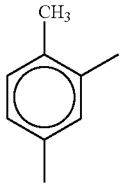

or

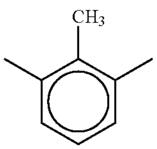

d) the divalent radical derived from diphenylmethane diisocyanate (MDI):

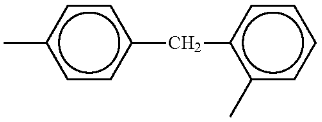

or

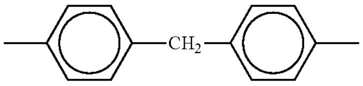

e) the divalent radical derived from hexamethylene diisocyanate (HDI):

$—(CH_2)_6—$;

f) the radical divalent derived from m-xylylene diisocyanate (XDI):

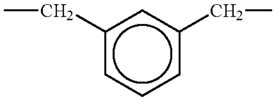

$R^2$ is the ethylene and/or isopropylene divalent radical;

$R^3$ is the methylene and/or n-propylene divalent radical; and $R^4$ and $R^5$ each represent the methyl or ethyl radical; and $R^6$ represents a hydrogen atom; a phenyl radical; a linear, branched or cyclic alkyl radical comprising from 1 to 6 carbon atoms.

Said polymer (A), sometimes designated by the term "SPUR", may be obtained according to the following process:

a) reaction of a polyether polyol of formula:

$H—[—OR_2]_n—OH$ with a stoichiometric excess of diisocyanate of formula:

$NCO—R^1—NCO$ in order to form a polyurethane-polyether block having at least two terminal —NCO groups; then b) reaction between the block obtained at the preceding step with a stoichiometric or a slight excess quantity of an alpha, beta or gamma-aminosilane:

$(R^5O)_{3-p}(R^4)_pSi—R^3—NHR^6$

Reference is made for more details to the international application WO 2013/136108 or to WO2014/031568.

Many SPUR are also commercially available such as:

SPUR+ 1015 LM from MOMENTIVE;

DESMOSEAL® S XP 2774, DESMOSEAL® S XP 2636 or DESMOSEAL® S XP 2749 from Covestro.

According to a preferred embodiment, the content of polymer (A) comprised in the composition according to the invention varies from 40 to 60% by weight.

Polymer (B) Comprising at Least 2 Alkoxysilyl Terminal Groups of Formula (II):

The moisture curable composition according to the invention comprises from 2.5 to 12% by weight of polymer (B).

Said polymer (B) is sometimes designated as a-STPE (for Silyl Terminated PolyEther). It may be obtained according to a process described in the document EP2336208 of BOSTIK.

According to a preferred embodiment, polymer (B) is such that in formula (II) R 2 is an isopropylene divalent radical and $R^4$ and $R^5$ are each a methyl or an ethyl.

Among the polymers of formula (II) available to the market, one may cite:

- GENIOSIL® STP-E10 (obtainable at Wacker) with a number average molecular weight of 8889 g/mol which comprises 2 terminal alkoxysilyl groups of formula: $Si(CH_3)(OCH_3)_2$, which are linked through the group: —O—CO—NI—I—$CH_2$— to a main polypropylene glycol chain;
- GENIOSIL® STP-E30 (obtainable at Wacker) with a number average molecular weight of 14493 g/mol which comprises 2 terminal alkoxysilyl groups of formula: $Si(CH_3)(OCH_3)_2$, which are linked through the group: —O—CO—NH—$CH_2$— to a main polyether chain.

According to a preferred embodiment, the content of polymer (B) comprised in the composition according to the invention varies from 3.7 to 10.5% by weight.

Alkoxy Modified Silsesquioxane (C):

The moisture curable composition according to the invention comprises from 7.5 to 28% by weight of an alkoxy modified silsesquioxane (C).

Silsesquioxane (C) are organosilicon compounds, which adopt cage-like or polymeric structures with Si—O—Si linkages.

Preferably the alkoxy modified silsesquioxane (C) is of formula (III):

(III)

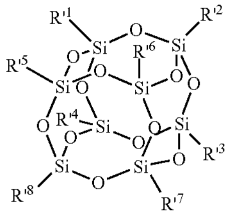

wherein to $R'^8$ are the same and different and represent:

- a hydrogen atom,
- a radical selected among a linear or branched $C_1$-$C_4$ alkoxy, a linear or branched alkyl comprising from 1 to 30 carbon atoms, an alkenyl comprising from 2 to 30 carbon atoms, an aromatic radical comprising from 6 to 30 carbon atoms, an allyl radical comprising from 3 to 30 carbon atoms, a cyclic aliphatic radical comprising from 3 to 30 carbon atoms, an acyl radical comprising from 1 to 30 carbon atoms; or
- a —$OSiR'^9R'^{10}$ group in which $R'^9$ and $R'^{10}$ represent a hydrogen atom, or a radical selected among a linear or branched $C_1$-$C_4$ alkyl, a linear or branched $C_1$-$C_4$ alkoxy, a $C_2$-$C_4$ alkenyl, a phenyl, a $C_3$-$C_6$ allyl radical, a $C_3$-$C_8$ cyclic aliphatic radical, a $C_1$-$C_4$ acyl radical;

provided that at least one of $R'^1$ to $R'^8$ is a $C_1$-$C_4$ alkoxy radical, preferably at least two.

The alkoxy modified silsesquioxanes (C) of formula (III) are known compounds which are described in particular in WO 2008/107331.

Preferably $R'^1$ to $R'^8$ in formula (III) represent a radical selected among methyl, methoxy or phenyl, provided that at least one of $R'^1$ to $R'^8$ is a methoxy, preferably at least two.

According to a preferred embodiment, the content of silsesquioxane (C) comprised in the composition according to the invention varies from 11.3 to 24.5% by weight.

According to a more preferred embodiment, the composition according to the invention comprises polymer (B) and silsesquioxane (C) in weight % quantity such that the weight ratio (B)/[(B)+(C)] lies in the range from 10 to 35%, preferably in the range from 15 to 30%. In such an embodiment, (B) and (C) can be advantageously introduced during the preparation of the composition according to the invention, combined as a single composition already available as a premix.

As an example of such a combination of (B) and (C), one may cite the commercial product Geniosil® XB502 from WACKER which comprises a mixture of:

- a methyl phenyl silsesquioxane (C) with methoxy end-groups and a number average molecular weight of about 800 g/mol, and
- a polymer (B) with a number average molecular weight of about 14000 g/mol and of formula (II) wherein p equals 1, $R^4$ and $R^5$ represent each a methyl, and the —$[OR_2]_n$— group derives from a polypropylene glycol;

said products (B) and (C) being combined in a weight ratio (B)/[(B)+(C)] of about 15 to 30%.

According to a preferred embodiment, the moisture curable composition according to the invention comprises:

- from 40 to 60% by weight of polymer (A);
- from 3.7 to 10.5% by weight of polymer (B); and
- from 11.3 to 24.5% by weight of silsesquioxane (C).

According to a particularly preferred embodiment, the moisture curable composition according to the invention comprises, in addition to (A), (B) and (C), from about 10 to 20% by weight of a polyether (D) which comprises at least one alkoxysily terminal group linked to the main polyether chain by a divalent group: —O—CO—NH—$(CH_2)_3$— in which —$(CH_2)_3$— is directly linked to the Si atom of the alkoxysily terminal group.

According to a first embodiment, polyether (D) comprises 2 alkoxysilyl terminal groups and is of formula (IV):

$$(R^5O)_{3-p}(R^4)_pSi—CH_2—CH_2—CH_2—NH—\underset{\underset{O}{\|}}{C}—[OR^2]_n—O—\underset{\underset{O}{\|}}{C}—NH—CH_2—CH_2—CH_2—Si(R^4)_p(OR^5)_{3-p} \qquad (IV)$$

wherein $R^2$, $R^4$, $R^5$, n and p are such as defined for formula (I).

Said polymer (D) is sometimes designated as γ-STPE (for Silyl Terminated PolyEther). It may also be obtained according to a process described in the document EP2336208 of BOSTIK.

According to a more preferred embodiment, in formula (IV) $R^2$ is an isopropylene divalent radical and $R^4$ and $R^5$ are each a methyl or an ethyl.

Among the polymers of formula (IV) available to the market, one may cite GENIOSIL® STP-E35 (obtainable at Wacker) with a number average molecular weight of 32240 g/mol which comprises 2 terminal alkoxysilyl groups of formula: $Si(OCH_3)_3$, which are linked through the group: —O—CO—NH—$(CH_2)_3$— to the main polyether chain.

According to a second embodiment, which is preferred, polyether (D) comprises only one alkoxysilyl terminal group. As an example of such a polyether, one may cite Geniosil® XM25 sold by Wacker, which is a monosilyl polymer with a number average molecular weight of about 6000 g/mol. It comprises a main chain of polyether type and a hydrolyzable propylene-methyldimethoxysilane end group.

According to another preferred embodiment, the moisture curable composition according to the invention comprises a curing catalyst, which may be any catalyst known to a person skilled in the art for the condensation of silanol. Mention may be made, as examples of such catalysts, of amines or organometallic derivatives, and in particular organic derivatives of iron, titanium, aluminum, or divalent or tetravalent tin.

Such compounds are commercially available, for example:

- from Evonik, such as TEGOKAT® 223, which is a catalyst based on dioctyl tin,
- from Dorf Ketal, such as TYZOR ® 726, which is a catalyst based on an ethylacetoacetate titanium complex; or
- from NITTO KASEI, such as NEOSTANN S-1, which is a catalyst based on the reaction product of silicic acid (H4SiO4) tetraethyl ester with bis(acetyloxy)dioctylstannane (CAS Number: 93925-43-0).

Weight amounts of curing catalyst usually lie in the range 0.1 to 2%.

According to still a preferred embodiment, the moisture curable composition according to the invention comprises, as a fire retardant, a phosphate ester or a derivative of a phosphate ester, such as the tris(2-ethylhexyl) phosphate, in a weight amount ranging from 10 to 20%. Such an embodiment is particularly appreciated for a use of the composition as a sealant for the transport industry, in particular for the equipment of trains, in order to protect passengers' safety in case of an accidental fire.

According to still a preferred embodiment, the moisture curable composition according to the invention is transparent, with respect to both its uncured and cured form. In such a case, the sealing composition may comprise a filler, in an amount not exceeding 10% by weight, which preferably consists of fumed silica. As an example of such a fumed silica, KONASIL K-D15 may be cited, which is commercially available from OCI company.

Optionally, the moisture curable composition according to the invention can contain one or more additional ingredients, such as a moisture scavenger, an adhesion promoter or a UV stabilizer.

It is preferable to monitor the moisture content of the composition according to the invention, so as to prevent immediate crosslinking of silylated polymers (A) and (B), and/or silsesquioxane (C), resulting in an increase in the viscosity of the composition during its storage. The moisture can be introduced into the composition by some of its ingredients.

For this reason, the composition according to the invention can comprise one or more dehydrating agents (or moisture scavengers). Appropriate dehydrating agents are in particular alkoxysilanes, such as trialkoxysilanes (in particular trimethoxysilanes) and alkoxysilanes comprising an amino, mercapto or epoxy group. It is possible to give, as examples thereof, vinyltrimethoxysilane (or VTMO), γ-glycidyloxypropyltrimethoxysilane, N-((3-aminoethyl)-γ-aminopropyltrimethoxysilane, aminopropyltrimethoxysilane or trimethoxymethylsilane.

Some of these compounds can also act as adhesion promoters, in particular the trialkoxysilanes comprising an amino, mercapto or epoxy group, such as [3-(2-aminoethyl) aminopropyl]trimethoxysilane (also designated as DAMO).

At last, the composition according to the invention can also comprise a UV stabilizer such as Tinuvie® 384-2, which is commercially available from BASF.

According to a preferred embodiment, the composition may comprise:

- from 0.1 to 2% of moisture scavenger, and
- from 0.5 to 3% of adhesion promoter.

The moisture curable composition according to the invention can be prepared by mixing the silylated polymer(s) (A) and (B), and the silsesquioxane (C) at a temperature ranging from 10° C. to 40° C. and at a relative humidity ranging from 0.1% to 50%. If a catalyst is present, it is preferably added in a second step, after the silylated polymers and the fillers (when present) have been mixed. The other additives are introduced in accordance with the usual practice.

As mentioned previously, and according to a preferred embodiment, polymer (B) and silsesquioxane (C) are introduced during the composition preparation combined as a single composition such that the weight ratio (B)/[(B)+(C)] lies in the range from 10 to 35%.

The present invention also relates to the use of the moisture curable silylated composition according to the invention, as an adhesive, sealant and/or coating material, preferably to its use for assembling metallic substrates and/or filling gaps between them, more preferably for aluminium substrates.

According to an embodiment, the use according to the invention is for assembling vent pipes, due to be included in the air conditioner systems for high-speed trains.

The following examples are given purely to illustrate the invention, but should not be interpreted as limiting its scope.

Example 1: Moisture-Curable Composition Based on Polymer (A), Polymer (B), Silsesquioxane (C) and Polyether (D)

1) Preparation:

The composition of example 1 is prepared by mixing, as disclosed previously, the ingredients pointed out in Table 1; polymer (B) and silsesquioxane (C) are introduced in the mixture as the commercial premix Geniosil® XB502. After its preparation, the composition is stored into a sealed cartridge, then is submitted to the following tests.

Viscosity of the composition was determined at 23° C. using a standard rheometer equipped with a plate of 25 mm diameter as measuring device, and running at a shear rate of 5.0 $s^{-1}$. A result comprised between 20 and 50 Pa·s was found.

Skinning time for the composition was tested in a conditioned room (at 23° C. and 50% of Relative Humidity), by first applying a strip of the composition on a substrate (for instance aluminium) and then using a finger to touch the surface of the composition every 5 minutes, to check if surface is skinned. The time needed for a skin to be formed is recorded. A result comprised between 20 and 30 minutes was obtained.

2) Determination of the Failure Mode of the Cured Composition Adhering to an Aluminium Substrate:

Use is made of a sample of a polyurethane foam board 10 mm thick, which is coated on both sides by an aluminium foil of 0.5 mm thickness.

The aluminium foil surface of the sample is cleaned from grease or dust by ethanol and then allowed to stand for 15 minutes for full evaporation of the solvent.

A bead of the composition is applied from the cartridge on the cleaned aluminium foil of the sample, then scraped from one side to the other side by a spatula, in order to form a strip of around 10 cm length, 2 cm width and 2-3 mm thickness.

The coated sample is left for curing in a conditioned room (at 23° C. and 50% of Relative Humidity) during 7 days, in order to form a strip of cured composition (adhesive joint) which adheres to the aluminium foil.

Then the failure mode of said strip is determined in a manual way, trying to insert a spatula between said strip and the aluminium foil substrate, in order to peel said strip off the aluminium foil.

It was not possible to peel said strip off the aluminium foil, because the strip itself broke apart, and the resulting remaining pieces were still sticking to the aluminium foil substrate.

The result of the failure mode was therefore determined as being 100% cohesive failure and noted 100% CF in Table 1.

This result shows the excellent adhesion of the cured composition to aluminium.

3) Determination of the Failure Mode of the Cured Composition Adhering to an Aluminium Substrate, After Being in Contact with Water During 7 Days:

The preceding determination was repeated except that, after curing for 7 days, the coated substrate was immersed in water during 7 days and then allowed to stay at room conditions for 30 minutes before proceeding to the determination of the failure mode.

The result of said failure mode was also determined as being 100% cohesive failure and noted 100% CF in Table 1.

This result shows that in addition to the excellent adhesion of the cured composition to aluminium, there is also an excellent adhesion to aluminium, for said cured composition after being exposed to water.

Examples 2 and 3: Moisture-Curable Composition Based on Polymer (A), Polymer (B) and Silsesquioxane (C)

1) Preparation:

Example 1 is repeated with the compositions shown in Table 1, namely without Geniosil XM25. The same tests as for example 1 were then implemented.

Same results for viscosity and skinning time were obtained.

2) Determination of the Failure Mode of the Cured Composition Adhering to an Aluminium Substrate:

Same results as for Example 1 were obtained, as pointed out in Table 1.

3) Determination of the Failure Mode of the Cured Composition Adhering to an Aluminium Substrate, After Being in Contact with Water During 7 Days:

When one tried to insert the spatula between the strip of cured composition and the aluminium foil substrate, it was found that said strip could be easily peeled off and that there were no remaining pieces sticking to the aluminium foil substrate.

The result of the failure mode was therefore determined as being 100% adhesive failure and noted 100% AF in Table 1.

Examples A, B and C (Comparative)

1) Preparation:

Example 1 is repeated with the compositions A, B and C shown in Table 1.

The same tests as for example 1 were then implemented.

Similar results for viscosity and skinning time were obtained.

2) Determination of the Failure Mode of the Cured Composition Adhering to an Aluminium Substrate:

When one tried to insert the spatula between the strip of cured composition and the aluminium foil substrate, it was found that said strip could be easily peeled off and that there were no remaining pieces sticking to the aluminium foil substrate.

The result of the failure mode was therefore determined as being 100% adhesive failure and noted 100% AF in Table 1.

3) Determination of the Failure Mode of the Cured Composition Adhering to an Aluminium Substrate, After Being in Contact with Water During 7 Days:

The result of the failure mode was also determined as being 100% adhesive failure and 15 noted 100% AF in Table 1.

TABLE 1

| Ingredient | | Content in % (weight/weight) | | | | | |
|---|---|---|---|---|---|---|---|
| Name | Structure/Function | Ex. 1 | Ex. 2 | Ex. 3 | Ex. A (comp.) | Ex. B (comp.) | Ex. C (comp.) |
| SPUR + 1015 LM | polymer (A) (SPUR) | 41 | 57.4 | 41 | 73.8 | 57.4 | 41 |
| Geniosil ® XB502 | Premix of Polymer (B) (α-STPE) and silsesquioxane (C) | 16.4 | 16.4 | 32.8 | — | — | — |
| Geniosil ® XM25 | polyether (D) (γ-STPE) | 16.4 | — | — | — | 16.4 | 32.8 |
| NEOSTANN S-1 | curing catalyst | 0.3 | 0.3 | 0.3 | 0.3 | 0.3 | 0.3 |
| Tris(2-ethylhexyl) phosphate | fire retardant agent | 16.4 | 16.4 | 16.4 | 16.4 | 16.4 | 16.4 |
| KONASIL K-D15 | fumed silica/filler | 6.6 | 6.6 | 6.6 | 6.6 | 6.6 | 6.6 |
| VTMO | moisture scavenger | 0.8 | 0.8 | 0.8 | 0.8 | 0.8 | 0.8 |
| DAMO | adhesion promoter | 1.3 | 1.3 | 1.3 | 1.3 | 1.3 | 1.3 |
| Tinuvin ® 384-2 | UV stabilizer | 0.8 | 0.8 | 0.8 | 0.8 | 0.8 | 0.8 |
| Tests | | Results | | | | | |
| Failure mode of the cured composition adhering to an aluminium substrate | | 100% CF | 100% CF | 100% CF | 100% AF | 100% AF | 100% AF |

TABLE 1-continued

| | | | | | | |
|---|---|---|---|---|---|---|
| Failure mode of the cured composition adhering to an aluminium substrate, after being in contact with water during 7 days | 100% CF | 100% AF | 100% AF | 100% AF | 100% AF | 100% AF |

The invention claimed is:

1. Moisture curable silylated composition comprising, on the basis of the total weight of said composition:

from 35 to 65% by weight of a polymer (A) comprising at least 2 alkoxysilyl terminal groups of formula (I):

(I)

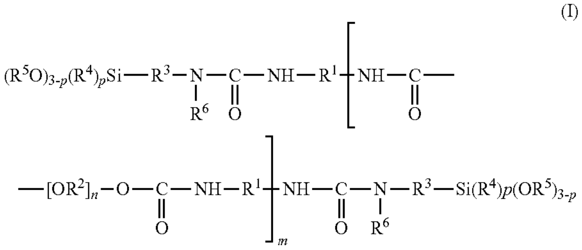

wherein $R^1$ represents a hydrocarbon-based divalent radical comprising from 5 to 15 carbon atoms which may be aromatic or aliphatic, linear, branched or cyclic, $R^2$ represents a linear or branched alkylene divalent radical comprising from 2 to 4 carbon atoms, $R^3$ represents a linear or branched alkylene divalent radical comprising from 1 to 6 carbon atoms, $R^4$ and $R^5$, which are identical or different, each represent a linear or branched alkyl radical having 1 to 4 carbon atoms, with the possibility, when there are several $R^4$ (or $R^5$) radicals, that these are identical or different, $R^6$ represents a hydrogen atom or a radical comprising 1 to 6 carbon atoms which may be aromatic or aliphatic, linear, branched or cyclic, or a radical selected among the radicals:

of formula (Ia):

(Ia)

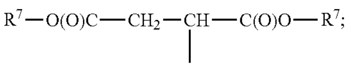

of formula (Ib):

(Ib)

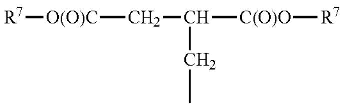

or of formula (Ic):

(Ic)

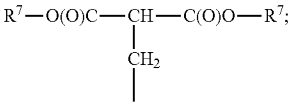

wherein $R^7$ is linear or branched alkyl radical comprising from 1 to 6 carbon atoms;

n is an integer such that the average molecular weight of the polyether block of formula —$[OR_2]_n$— is between 300 g/mole and 40000 g/mole, m is an integer different from 0 such that the average molecular weight of the polymer (A) is between 500 g/mole and 50000 g/mole, and p is an integer equal to 0, 1 or 2;

from 2.5 to 12% by weight of a polymer (B) comprising at least 2 alkoxysilyl terminal groups of formula (II)

(II)

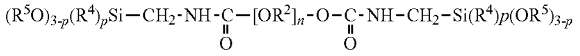

wherein $R^2$, $R^4$, $R^5$, n and p are such as defined for formula (I); and from 7.5 to 28% by weight of an alkoxy modified silsesquioxane (C), and from about 10 to 20% by weight of a polyether (D) which comprises only one alkoxysilyl terminal group linked to the main polyether chain by a divalent group:—O—CO—NH—$(CH_2)_3$— in which —$(CH_2)_3$— is directly linked to the Si atom of the alkoxysilyl terminal group.

2. Moisture curable silylated composition according to claim 1, wherein polymer (A) is such that:

$R^1$ is chosen from one of the following divalent radicals, the formulae of which below show the 2 free valences:

a) the divalent radical derived from isophorone diisocyanate (IPDI):

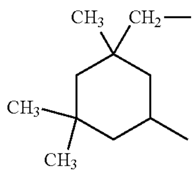

b) the divalent radical derived from methylenebis(cyclohexyl isocyanate) (HMDI):

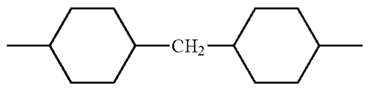

c) the divalent radical derived from tolylene diisocyanate (TDI):

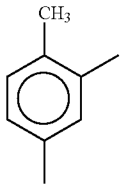

or

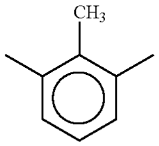

d) the divalent radical derived from diphenylmethane diisocyanate (MDI):

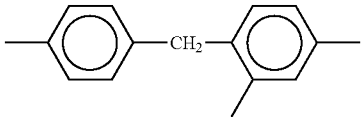

or

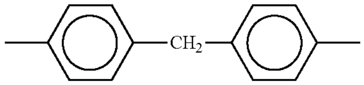

e) the divalent radical derived from hexamethylene diisocyanate (HDI):

$—(CH_2)_6—$;

f) the radical divalent derived from m-xylylene diisocyanate (XDI):

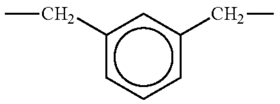

$R^2$ is the ethylene and/or isopropylene divalent radical;

$R^3$ is the methylene and/or n-propylene divalent radical; and $R^4$ and $R^5$ each represent the methyl or ethyl radical; and $R^6$ represents a hydrogen atom; a phenyl radical; or a linear, branched or cyclic alkyl radical comprising from 1 to 6 carbon atoms.

3. Moisture curable silylated composition according to claim 1, wherein polymer (B) is such that in formula (II) $R^2$ is an isopropylene divalent radical and $R^4$ and $R^5$ are each a methyl or an ethyl.

4. Moisture curable silylated composition according to claim 1, wherein the alkoxy modified silsesquioxane (C) is of formula (III):

(III)

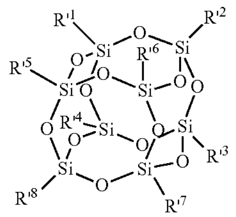

wherein $R'^1$ to $R'^8$ are the same and different and represent:

a hydrogen atom, a radical selected among a linear or branched $C_1$-$C_4$ alkoxy, a linear or branched alkyl comprising from 1 to 30 carbon atoms, an alkenyl comprising from 2 to 30 carbon atoms, an aromatic radical comprising from 6 to 30 carbon atoms, an allyl radical comprising from 3 to 30 carbon atoms, a cyclic aliphatic radical comprising from 3 to 30 carbon atoms, an acyl radical comprising from 1 to 30 carbon atoms; or a $—OSiR'^9R'^{10}$ group in which $R'^9$ and $R'^{10}$ represent a hydrogen atom, or a radical selected among a linear or branched $C_1$-$C_4$ alkyl, a linear or branched $C_1$-$C_4$ alkoxy, a $C_2$-$C_4$ alkenyl, a phenyl, a $C_3$-$C_6$ allyl radical, a $C_3$-$C_8$ cyclic aliphatic radical, a $C_1$-$C_4$ acyl radical;

provided that at least one of $R'^1$ to $R'^8$ is a $C_1$-$C_4$ alkoxy radical.

5. Moisture curable silylated composition according to claim 4, wherein $R'^1$ to $R'^8$ in formula (III) represent a radical selected from the group consisting of methyl, methoxy and phenyl, provided that at least one of $R'^1$ to $R'^8$ is a methoxy.

6. Moisture curable silylated composition according to claim 1, wherein it comprises polymer (B) and silsesquioxane (C) in weight % quantity such that the weight ratio (B)/[(B)+(C)] lies in the range from 10 to 35%.

7. Moisture curable silylated composition according to claim 1, wherein it comprises:

from 40 to 60% by weight of polymer (A);

from 3.7 to 10.5% by weight of polymer (B); and from 11.3 to 24.5% by weight of silsesquioxane (C).

8. An adhesive, sealant and/or coating material comprising the moisture curable silylated composition as defined in claim 1.

* * * * *